United States Patent
Steinbach et al.

(10) Patent No.: US 9,226,122 B2
(45) Date of Patent: Dec. 29, 2015

(54) MESSAGING SERVICE CONTROL COMMUNICATED USING SHORT MESSAGE PEER-TO-PEER PROTOCOL FIELDS

(71) Applicant: Cellco Parternship, Arlington, VA (US)

(72) Inventors: Lodema Margaret Steinbach, Clayton, CA (US); Wei Guang Tan, San Jose, CA (US); Zhijian Lin, Dublin, CA (US)

(73) Assignee: Cellco Partnership, Basking Ridge, NJ (US)

( * ) Notice: Subject to any disclaimer, the term of this patent is extended or adjusted under 35 U.S.C. 154(b) by 147 days.

(21) Appl. No.: 13/795,525

(22) Filed: Mar. 12, 2013

(65) Prior Publication Data

US 2014/0273981 A1   Sep. 18, 2014

(51) Int. Cl.
*H04W 8/18* (2009.01)
*H04W 4/14* (2009.01)

(52) U.S. Cl.
CPC ..................................... *H04W 4/14* (2013.01)

(58) Field of Classification Search
CPC ......... H04W 12/06; H04W 4/12; H04W 4/14; H04W 8/18; G06Q 30/02
See application file for complete search history.

(56) References Cited

U.S. PATENT DOCUMENTS

2011/0165860 A1\* 7/2011 Cai et al. .................... 455/411
2012/0066048 A1\* 3/2012 Foust et al. ................ 705/14.26

\* cited by examiner

*Primary Examiner* — Myron K Wyche

(57) ABSTRACT

A network service provider and an application service provider may maintain synchronized states of which users have opted-in and which have opted-out of messaging services. In one implementation, a method may include receiving a text message from a user device and determining, based on a presence of one or more keywords in the text message, whether the text message is an opt-in or opt-out message associated with a messaging service hosted by one or more servers. The method may further include modifying, when it is determined that the text message is an opt-in or opt-out message, the text message to add a parameter to the text message, the parameter having a first value when the text message is an opt-in message and a second value when the text message is an opt-out message. The modified text message may be transmitted towards the one or more servers.

18 Claims, 9 Drawing Sheets

MESSAGING SERVICE CONTROL COMMUNICATED USING SHORT MESSAGE PEER-TO-PEER PROTOCOL FIELDS

BACKGROUND

Users of mobile telephones and smartphones often communicate using techniques other than voice communications. For example, Short Message Service (SMS) is a text messaging service, using standardized communication protocols, that provides for the exchange of short text messages between fixed line or mobile telephone devices. SMS may be used to send text messages between end-users of mobile telephones and/or fixed line devices. Additionally, SMS may be used to provide text messages from online applications or services to users. For example, a user may sign up ("opt-in") to be alerted, via a text message, when an event occurs that is relevant to the user (e.g., a weather service may send a text message alert when severe weather is forecast for a particular area).

Some services, that are provided via text messages, may allow users to initiate and terminate the service by texting particular keywords to an SMS address. For example, the keywords "start" and "stop" may commonly be used to indicate that a user would like to start or stop a particular service. In this situation, a user may text "start" to a desired shortcode (a special telephone number that is shorter than a full telephone number) to start a service. Subsequent text messages for the service may come from the shortcode. The user may text "stop" to the shortcode to end the service.

Network providers, such as a cellular network operator, have an interest in ensuring that the users of the network only receive text messages from sources authorized and/or desired by the users. Users that receive a large amount of unwanted text messages may be dissatisfied and tend to blame the network provider.

DETAILED DESCRIPTION OF PREFERRED EMBODIMENTS

The following detailed description refers to the accompanying drawings. The same reference numbers in different drawings may identify the same or similar elements.

Techniques described herein may provide for a robust opt-in and/or opt-out mechanism through which a network service provider and an application service provider may maintain synchronized states of which users have opted-in and which have opted-out of a service offered by the application service provider. In one implementation, the network service provider may detect, based on one or more keywords included in a text message, an opt-in/opt-out choice that is made by a user. The network service provider may signal the opt-in/opt-out decision, to the application service provider, by setting a particular value in a predetermined field of a message sent from the network service provider to the application service provider. In one implementation, the message may by a Short Message Peer-to-Peer (SMPP) message that includes an optional parameter that indicates whether a user is opting-in or opting-out of a service.

Figure 1:
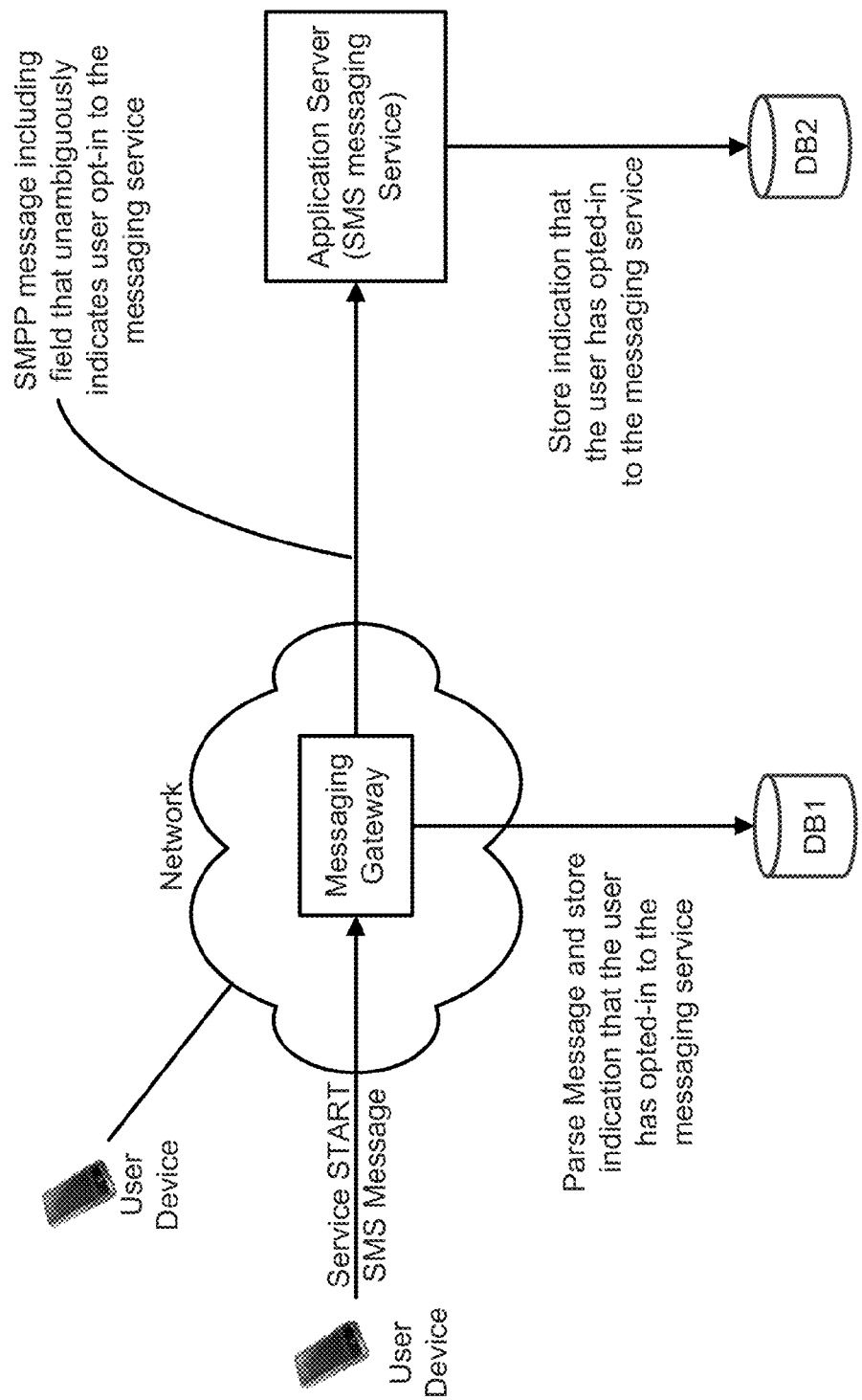
FIG. 1 is a diagram conceptually illustrating an example of an overview of concepts described herein.

FIG. 1 is a diagram conceptually illustrating an example of an overview of concepts described herein. As shown in FIG. 1, user devices, such as mobile devices, may communicate with a network, such as through wireless connections. The users may send and receive text messages, such as SMS messages, with other users or with computing servers, such as an application server that implements a SMS messaging service. The user may start and stop a subscription to the messaging service by sending text messages to the application server. For example, the user may subscribe to the SMS service by texting the word "START" to the application server and may unsubscribe from the SMS service by texting the word "STOP" to the application server.

Text messages may be processed by the network through a messaging gateway, which may generally act to store and forward the messages towards their final destination. For messages directed to the application server, the messaging gateway may use a protocol such as SMPP to exchange the message with another messaging gateway or directly with the application server. Before forwarding the message to the application server, the messaging gateway may determine (e.g., based on the presence of the word "START" in the message) that the message requests that a subscription to the messaging service should be started. The messaging gateway may store an indication that the user has subscribed to the particular messaging service (e.g., a database (DB1), may be updated to indicate that the user has subscribed to the particular messaging service). Before forwarding the message, the messaging server may set a particular field, such as an optional field in the SMPP protocol, to a predetermined value that indicates that the message is an opt-in message for the messaging service.

The application server may receive the message from the messaging gateway. The application server may examine the particular field that is set in the message to unambiguously determine that the message is an opt-in message. The application server may store an indication that the user has subscribed to the particular messaging service ((e.g., a database (DB2) may be updated to indicate that the user has subscribed to the particular messaging service). In this manner, the opt-in state of the user with respect to the messaging service may be synchronized between the messaging gateway and the application server.

In contrast, in some existing systems, the messaging gateway may simply forward the opt-in message to the application server. The application server may then independently parse the message, such as by parsing the user-entered text portion of the message, to determine whether the message is an opt-in message. The user-entered text of the message may, however, include formatting errors or formatting irregularities that may cause errors and/or discrepancies between the opt-in/opt-out states that are determined by the messaging gateway and the application server. Additionally, different application servers and messaging gateways may implement different parsing routines, which may also cause errors and/or discrepancies between the opt-in/opt-out states that are determined by the messaging gateway and the application server. This can be undesirable and can lead to user frustration, such as due to the reception of unsolicited messages by the users, and/or to wasted computing resources, due to the blocking of unsolicited messages, by the network service provider.

Figure 2:
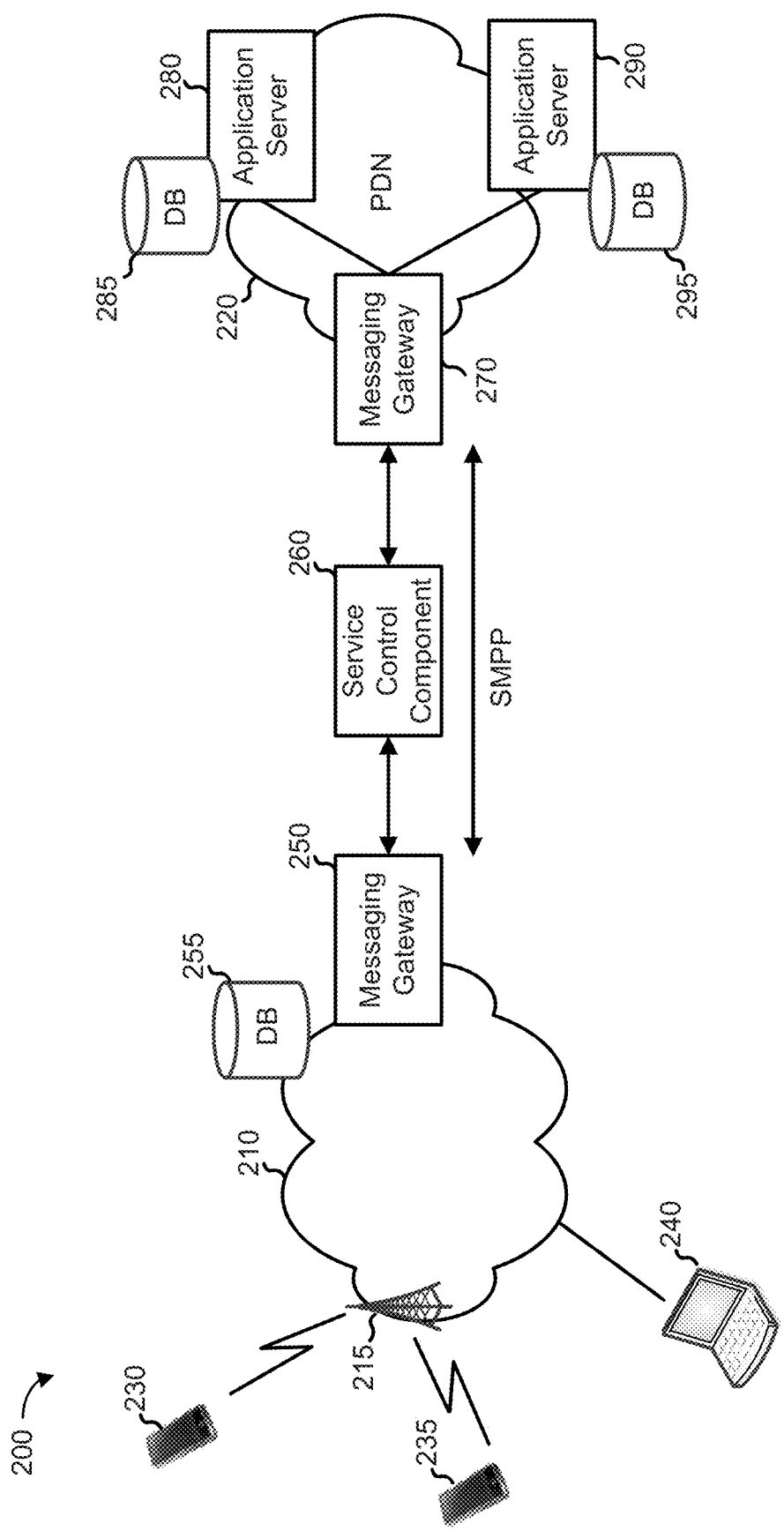
FIG. 2 is a diagram of an example environment in which systems and/or methods described herein may be implemented.

FIG. 2 is a diagram of an example environment 200 in which systems and/or methods described herein may be implemented. As illustrated, environment 200 may include a network 210 and a packet data network (PDN) 220. Network 210 may include a network associated with or provided by a network service provider. Network 210 may include a wireless network, a wired network, and/or a combination of a wireless and wired network. For example, a network service provider may provide cellular network connections to mobile devices (e.g., smart phones, etc.). In one implementation, network 210 may include a network that provides a radio interface to user devices and may be implemented based on, for example, the Long Term Evolution (LTE) standard. Network 210 may include a base station 215, which, in the context of an LTE network, may be called an eNodeB.

A number of user devices may connect to network 210, illustrated as user devices 230, 235, and 240. User devices 230-240 may include, for example, portable computing and communication devices that connect to network 210 via a wireless connection to base station 215, such as a personal digital assistant (PDA), a smart phone, a cellular phone, a laptop computer with connectivity to a cellular wireless network, a tablet computer, etc. Alternatively or additionally, user devices 230-240 may include a personal computer, laptop, or other device that connects to network 210 via a wired connection (e.g., fiber optic link, cable connection, etc.).

Messaging gateway 250 may additionally be included in or associated with network 210. Messaging gateway 250 may generally act to store, forward, convert, and deliver text messages, such as SMS messages. Messaging gateway 250 may forward received messages to user devices, such as devices 230-240, or to other messaging gateways, such as messaging gateway 270 (associated with PDN 220). In one implementation, messaging gateway 250 may include a Short Message Service Center (SMSC). Messaging gateway 250, when communicating with other gateways, such as messaging gateway 260, and may use a protocol such as the SMPP protocol.

Service control component 260 may parse text messages from user devices 230-240 to determine whether the user is attempting to opt-in or opt-out of a particular messaging service. Service control component 260, when it detects a message that is an opt-in or opt-out message, may modify the message, such as by adding one or more optional SMPP parameters to the message and setting the added parameter to a value that indicates that the message is an opt-in and/or opt-out message. The operation of service control component 260 will be described in more detail below. Although illustrated as a separate component from messaging gateway 250, in some implementations, the functionality of service control component 260 may be implemented as part of messaging gateway 250. Additionally, although shown as separate from network 210, service control component 260 may be implemented as part of network 210 or external to network 210.

Database 255 may store an indication of which user devices 230-240 have opted-in and/or opted-out of messaging services. In other words, database 255 may store the opt-in/opt-out state of the users of network 210 with respect to various messaging services. Database 255 may be maintained by messaging gateway 250, by service control component 260, and/or by other network elements associated with network 210. Database 255 may include a database, file structure, or other data structure that stores information relating to the opt-in/opt-out state of user devices 230-240.

PDN 220 may include a packet-based network to which devices 230-240 may connect. PDN 220 may include a public network, such as the Internet, a proprietary or private network, or other types of networks. PDN 220 may include one or more computing devices that may receive and/or send text messages with user devices 230-240, such as messaging gateway 270, application servers 280 and 290, and databases 285 and 295. Incoming and outgoing messages, from PDN 220, may be processed by messaging gateway 270. As with messaging gateway 250, messaging gateway 270 may generally act to store, forward, convert and deliver text messages, such as SMS messages. Messaging gateway 270 may forward received messages, from application servers 280 and 290, to messaging gateway 250, which may further forward the messages to user devices 230-240. In one implementation, messaging gateway 270 may include a SMSC gateway. Messaging gateway 270, when communicating with messaging gateway 250, may use, for example, the SMPP protocol.

In some implementations, messaging gateway 270 may be omitted and/or application servers 280 and 290 may act as messaging gateways in place of messaging gateway 270. In this situation, messaging gateway 250 may communicate, via the SMPP protocol, with application servers 280 and 290.

Application servers 280 and 290 may each include one or more computing devices that provide messaging services to user devices 230-240. For example, one of application servers 280 and 290, such as application server 280, may include a weather status server that provides periodic weather updates, via text messages, to subscribes users. As another example, application server 280 may provide notifications that are relevant to the user with respect to the user's interaction at a particular website. For example, a social media website may provide an option for a user to opt-in to a text message service in which a text message is sent to the user whenever someone communicates with the user through the social media website.

Application servers 280 and 290 may include, or be associated with, databases 285 and 295, respectively. Databases 285 and 295 may generally store an indication of which user devices 230-240 have opted-in and/or opted-out of messaging services. In one implementation, databases 285 and 295 may be maintained by application servers 280 in 290, respectively. Alternatively or additionally, databases 285 and 295 may be maintained by messaging gateway 270. Databases 285 and 295 may include a database, file structure, or other data structure that stores information relating to the opt-in/opt-out state of user devices 230-240.

Although messaging gateways 250 and 270 and application servers 280 and 290 will generally be described herein in the context of SMS text messages, in other implementations, other types of messages may alternatively and/or additionally be used. For example, multimedia messages may be used, such as multimedia messages provided via the Multimedia Messaging Service (MMS) protocol. In this case, messaging gateways 250 and 270 may include SMS and MMS messaging gateway functionality.

Although FIG. 2 illustrates example components of environment 200, in other implementations, environment 200 may contain fewer components, different components, differently arranged components, or additional components than those depicted in environment 200. Alternatively, or additionally, one or more components of environment 200 may perform one or more other tasks described as being performed by one or more other components of environment 200.

Figure 3A:
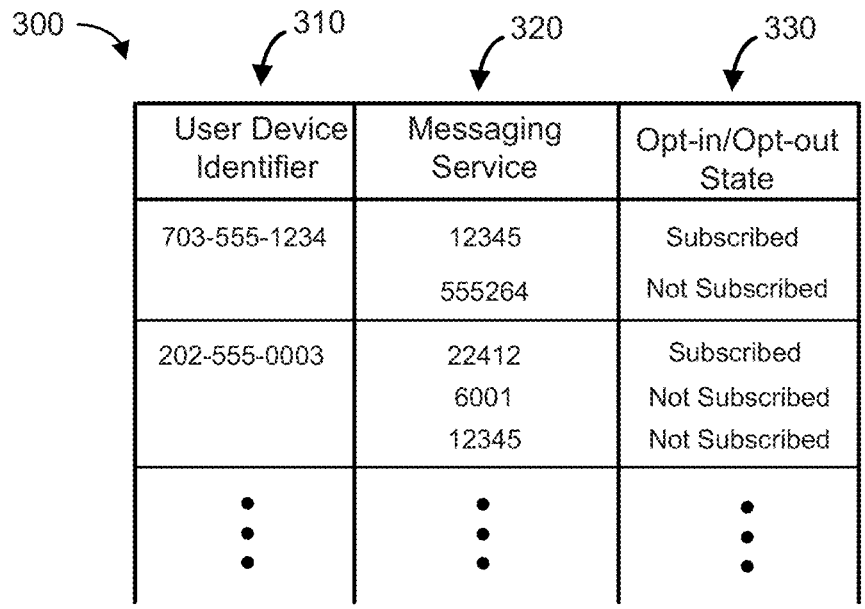
FIGS. 3A and 3B are diagrams illustrating example data structure that may be maintained by databases shown in FIG. 2.

FIG. 3A is a diagram illustrating an example data structure 300 that may be maintained by database 255. Data structure 300 may store information relating to the opt-in/opt-out state of messaging services subscribed to by the user's of user devices 230-240. A number of example fields are illustrated for data structure 300, including: user device identifier field 310, messaging service field 320, and opt-in/opt-out state field 330. User device identifier field 310 may identify a particular user device 230-240 and/or particular account associated with the user device. User device identifier field 310 may include, for each entry, a value that uniquely identifies a particular user device 230-240. For example, user device identifier field 310 may include phone numbers assigned to mobile devices, the International Mobile Station Equipment Identity (IMEI) value corresponding to a mobile device, or an account name associated with the user. Messaging service field 320 may list, for each corresponding user device, one or more messaging services that are applicable to the corresponding user device. The one or more messaging services may include SMS or MMS services in which a user has opted-in or opted-out. In one implementation, the messaging services may be identified by a shortcode associated with the service. As previously mentioned, a shortcode may refer to a special telephone number that is generally shorter than a full telephone number.

Opt-in/opt-out state field 330 may include an indication of the opt-in/opt-out state of a particular messaging service (e.g., "subscribed" may indicate that the user has opted-in to the messaging service and "not subscribed" may indicate that the user has opted-out of a service in which the user previously opted-in). In an alternative possible implementation, opt-in/opt-out state field 330 may not be present and instead the messaging services that are identified in messaging service field 320 may only be messaging services to which a user is currently opted-in (i.e., when a user opts-out of a messaging service, the corresponding identifier in messaging service field 320 may be deleted).

As one example of an entry in data structure 300, consider the entry corresponding to the user device having the phone number "703-555-1234." The user may be currently subscribed (e.g., previously opted-in) to the messaging service associated with the shortcode "12345" and the user may no longer be subscribed (e.g., previously opted-in and then opted-out) to the messaging service associated with the shortcode "555264."

Figure 3B:
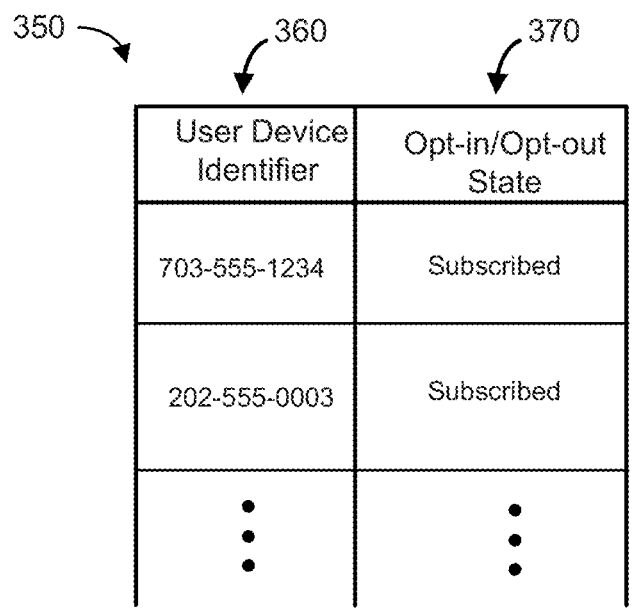

FIG. 3B is a diagram illustrating an example data structure 350 that may be maintained by databases 285 and/or 295. Data structure 350 may store information relating to the opt-in/opt-out state of messaging services provided by application servers 280 and/or 290. In this example, data structure 350 may be maintained on a per-application server basis (e.g., for each messaging service). Two example fields are illustrated for data structure 350, including: user device identifier field 360 and opt-in/opt-out state field 370. User device identifier field 360 may include, for each entry, a value that uniquely identifies a particular user device 230-240. For example, user device identifier field 360 may include phone numbers assigned to mobile devices or an account name associated with the user of user device. Opt-in/opt-out state field 370 may include an indication of the opt-in/opt-out state of the particular messaging service corresponding to data structure 350. In an alternative possible implementation, opt-in/opt-out field 350 may not be present and instead data structure 350 may simply include a list of subscribed user devices for a particular service.

As one example of an entry in data structure 350, consider the entry corresponding to user device "703-555-1234." As shown in corresponding field 370, this user device may be subscribed to the message service associated with data structure 350.

In FIGS. 3A and 3B, the fields illustrated in data structures 300 and 350 are examples. In other implementations, other, additional, or fewer fields could be implemented, or different types of data structures could be used (e.g., linked lists, etc.).

Figure 4:
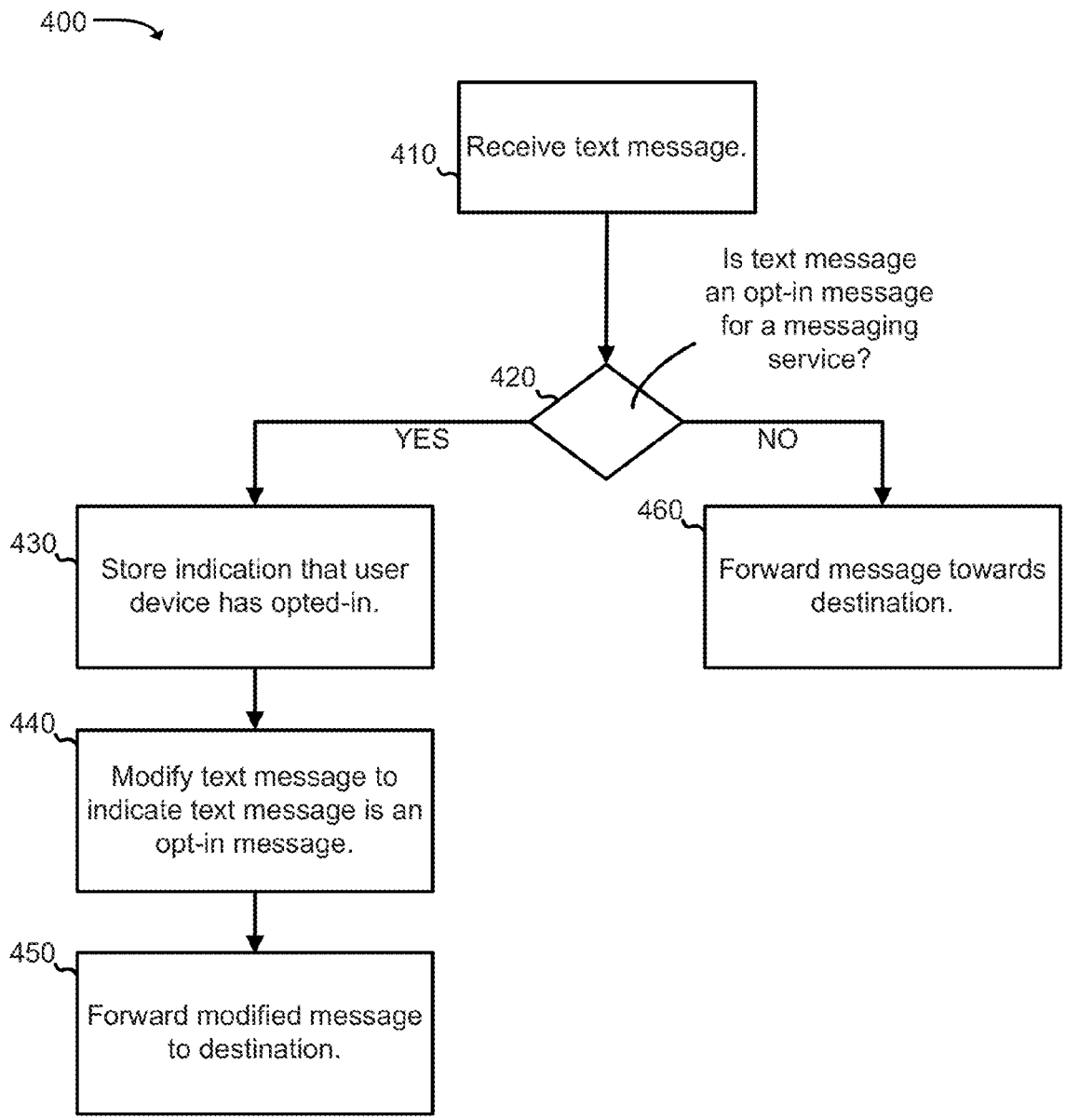
FIG. 4 is a flow chart illustrating an example process relating to opting-in to messaging services.

FIG. 4 is a flow chart illustrating an example process 400 relating to opting-in to messaging services. Process 400 may be implemented, for example, by service control component 260.

Assume that a user, of one of user devices 230-240, wishes to subscribe to a particular messaging service, such as a messaging service associated with a particular shortcode. The user may send a SMS text message, in which the body of the text message includes the "START" keyword (or another keyword), to the shortcode associated with the messaging service.

Process 400 may include receiving the text message (block 410). The text message may be received at service control component 260, such as after the text message is transmitted through network 210, messaging gateway 250, and to service control component 260. Messaging gateway 250 may transmit the message to service control component 260 as an SMPP message.

Process 400 may further include determining whether the text message is an opt-in message for a messaging service (block 420). As mentioned, the determination may be made based on the comparison of words or phrases in the text message to one or more words or phrases that may be used to indicate that the user is opting-in to the messaging service. For example, an opt-in message may include a single word such as "START" or "BEGIN". In some implementations, the words or phrases that indicate that the user would like to opt-in to the messaging service may be specified by an operator of network 210 and/or the operator of service control component 260. In other implementations, different messaging services may be able to use different opt-in words or phrases. In this situation, service control component 260 may determine the appropriate opt-in words or phrases based on the messaging service corresponding to the text message (e.g., the service control component may use the destination shortcode, corresponding to the text message, to look up the opt-in words or phrases associated with the messaging service).

When the text message is determined to be an opt-in message, (block 420—YES), process 400 may include storing an indication that the user device has opted in to the messaging service (block 430). For example, service control component 260 may store, in database 255, an indication that the user device that originated the text message is subscribed to the messaging service to which the text message is destined (e.g., the messaging service corresponding to the shortcode that was used to address the text message).

Process 400 may further include modifying the text message to indicate that the text message is an opt-in message (block 440). In one implementation, modifying the text message may include adding an optional parameter to the text message, or generating a new message based on the text message, which includes an additional parameter. For example, for an SMPP message, a number of optional parameters are specified in the SMPP protocol and that may be used based on the particular application context. One such optional parameter is the "source_subaddress" parameter, which may normally be a two octet value used to specify a subaddress associated with the originator of the message. Consistent with aspects described herein, the "source_subaddress" parameter may be inserted into the text message, but instead of being used to specify a subaddress associated with the originator of the message, may be used to specify whether the message is an opt-in (or opt-out) message. For example, a first value (e.g., 67846, which corresponds to "optin" on the dialpad, or another value) may be set for the "source_subaddress" parameter to indicate that the message is an opt-in message. As will be described below with reference to FIGS. 6 and 7, a second value (e.g., 678688, which corresponds to "optout" on the dialpad, or another value) may be set for the "source_subaddress" parameter to indicate that the message is an opt-out message. In other implementations, parameters other than the "source_subaddress" parameter may be used to indicate the opt-in/opt-out state of the message.

Process 400 may further include forwarding the modified message towards the destination (block 450). Service control component 260 may, for example, forward the modified message to messaging gateway 270. In situations in which messaging gateway 270 is not implemented (e.g., situations in which application servers 280/290 act as messaging gateways), service control component 260 may forward the message towards the appropriate application server 280 or 290.

Referring back to block 420, when the text message is determined to not be an opt-in message, (block 420—NO), process 400 may include forwarding the message towards the destination. The message may be forwarded via, for example, the SMPP protocol.

Figure 5:
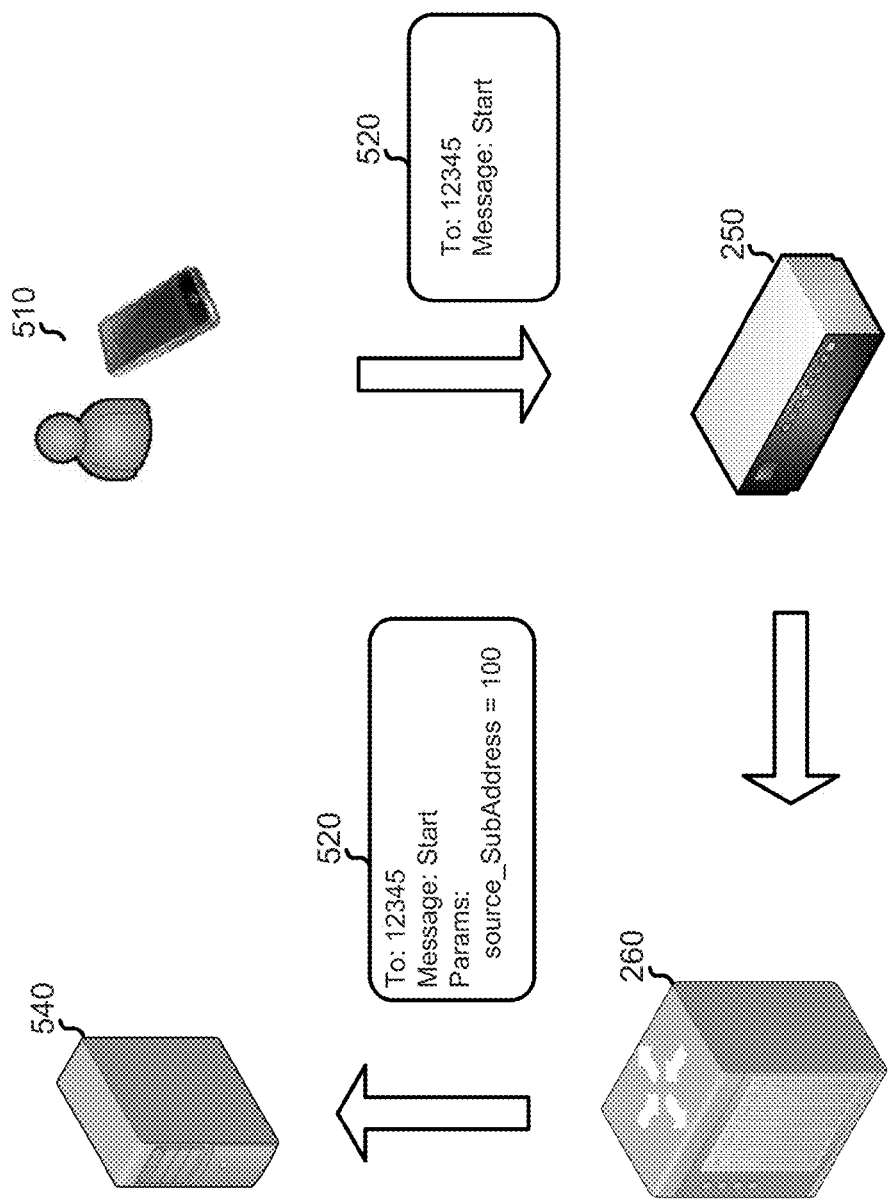
FIG. 5 is a diagram conceptually illustrating an example of application of the process shown in FIG. 4.

FIG. 5 is a diagram conceptually illustrating an example of application of the process shown in FIG. 4. As illustrated, a customer 510 (e.g., corresponding to one of user devices 230-240) may desire to opt in to a messaging service associated with the shortcode "12345." Customer 510 may send a text message 520 to a messaging gateway, such as messaging gateway 520. Text message 520 may contain text (e.g., "START") that indicates that the customer would like to start services provided by the application service associated with the shortcode. Service control component 260 may receive text message 520 and determine, based on the text of the message, that it is an opt-in message. Service control component 260 may modify text message 520, such as by appending the "source_subaddress" parameter (with a value that indicates that text message 520 is an opt-in message). Service control component 260 may then forward text message 520 to messaging service 540 (e.g., to one of application servers 280-290). Messaging service 540, when it receives text message 520, may, based on the presence of value in the "source_subaddress" parameter of text message 520, determine that the message is an opt-in message for the service.

Figure 6:
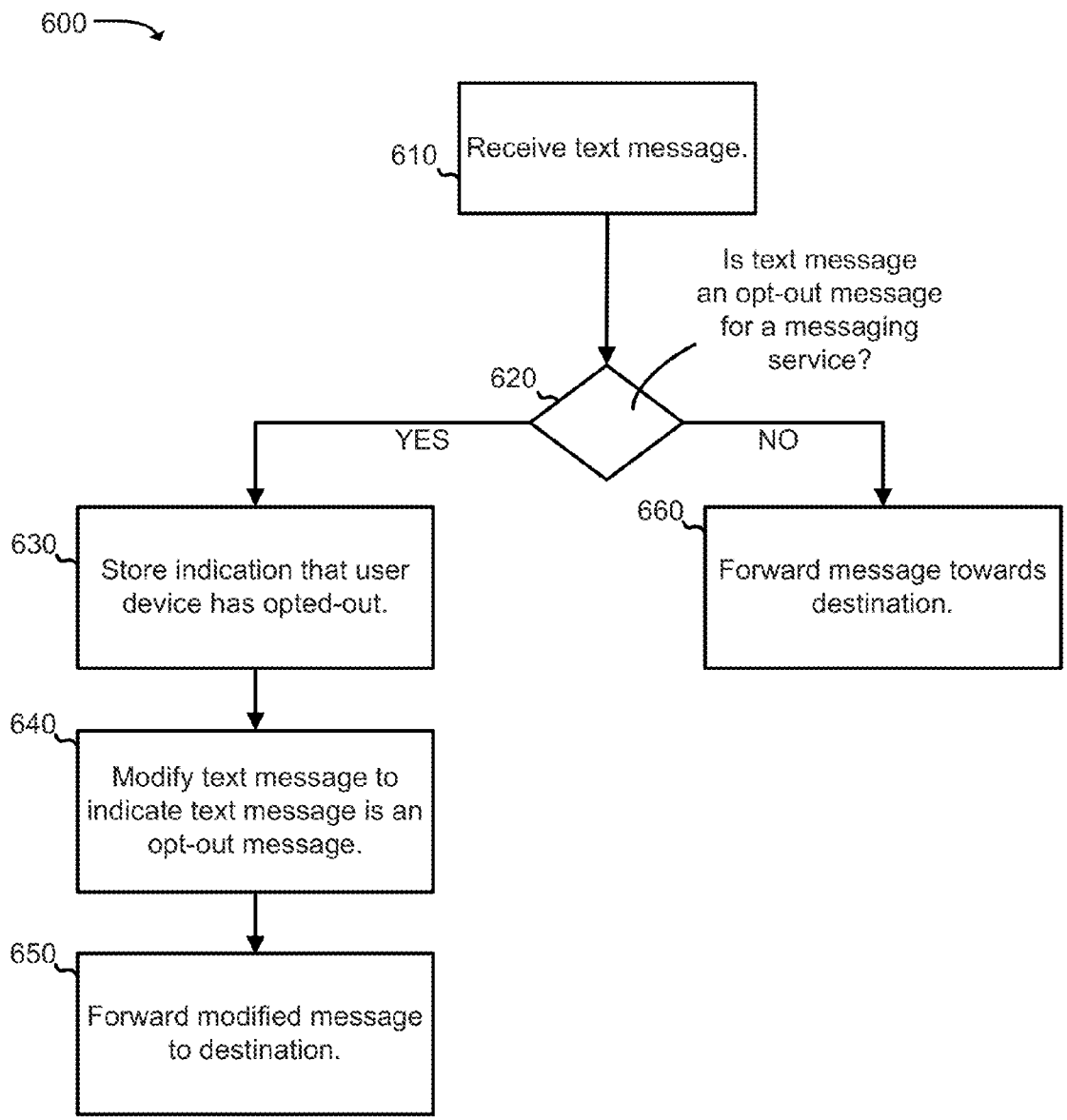
FIG. 6 is a flow chart illustrating an example process relating to opting-out to messaging services.

FIG. 6 is a flow chart illustrating an example process 600 relating to opting-out to messaging services. Process 600 may be implemented, for example, by service control component 260.

Assume that a user, of one of user devices 230-240, wishes to unsubscribe to a particular messaging service, such as a messaging service associated with a particular shortcode. The user may send a SMS text message, in which the body of the text message includes the "STOP" keyword (or another keyword), to the shortcode associated with the messaging service.

Process 600 may include receiving the text message (block 610). The text message may be received at service control component 260, such as after the text message is transmitted through network 210, messaging gateway 250, and to service control component 260. Messaging gateway 250 may transmit the message to service control component 260 as an SMPP message.

Process 600 may further include determining whether the text message is an opt-out message for a messaging service (block 620). As mentioned, the determination may be made based on the comparison of words or phrases in the text message to one or more words or phrases that may be used to indicate that the user is opting-out of a messaging service in which the user previously opted-in. For example, an opt-in message may include a single word such as "STOP" or "END". In some implementations, the words or phrases that indicates that the user would like to opt-out of the messaging service may be specified by an operator of network 210 and/or the operator of service control component 260. In other implementations, different messaging services may be able to use different opt-out words or phrases. In this situation, service control component 260 may determine the appropriate opt-out words or phrases based on the messaging service corresponding to the text message (e.g., service control component 260 may use the destination shortcode, corresponding to the text message, to look up the opt-out words or phrases associated with the messaging service).

When the text message is determined to be an opt-out message, (block 620—YES), process 600 may include storing an indication that the user device has opted-out to the messaging service (block 630). For example, service control component 260 may store, in database 255, an indication that the user device that originated the text message is no longer subscribed to the messaging service to which the text message is destined (e.g., the messaging service corresponding to the shortcode that was used to address the text message). Alternatively, "storing" the indication may correspond to removing the user from a list (or other data structure) that contains the subscribed user devices for the messaging service.

Process 600 may further include modifying the text message to indicate that the text message is an opt-out message (block 640). In one implementation, modifying the text message may include adding an optional parameter to the text message. As previously mentioned, one such optional parameter is the "source_subaddress" parameter. Consistent with aspects described herein, the "source_subaddress" parameter may be inserted into the text message and may include a value, different than the opt-in value (e.g., 200), that is used to specify that the message is an opt-out message. In other implementations, parameters other than the "source_subaddress" parameter may be used to indicate the opt-in/opt-out state of the message.

Process 600 may further include forwarding the modified message towards the destination (block 650). Service control component 260 may, for example, forward the modified message to messaging gateway 270. In situations in which messaging gateway 270 is not implemented (e.g., situations in which application servers 280/290 act as messaging gateways), service control component 260 may forward the message towards the appropriate application server 280 or 290.

Referring back to block 620, when the text message is determined to not be an opt-out message, (block 620—NO), process 600 may include forwarding the message towards the destination. The message may be forwarded via, for example, the SMPP protocol.

Figure 7:
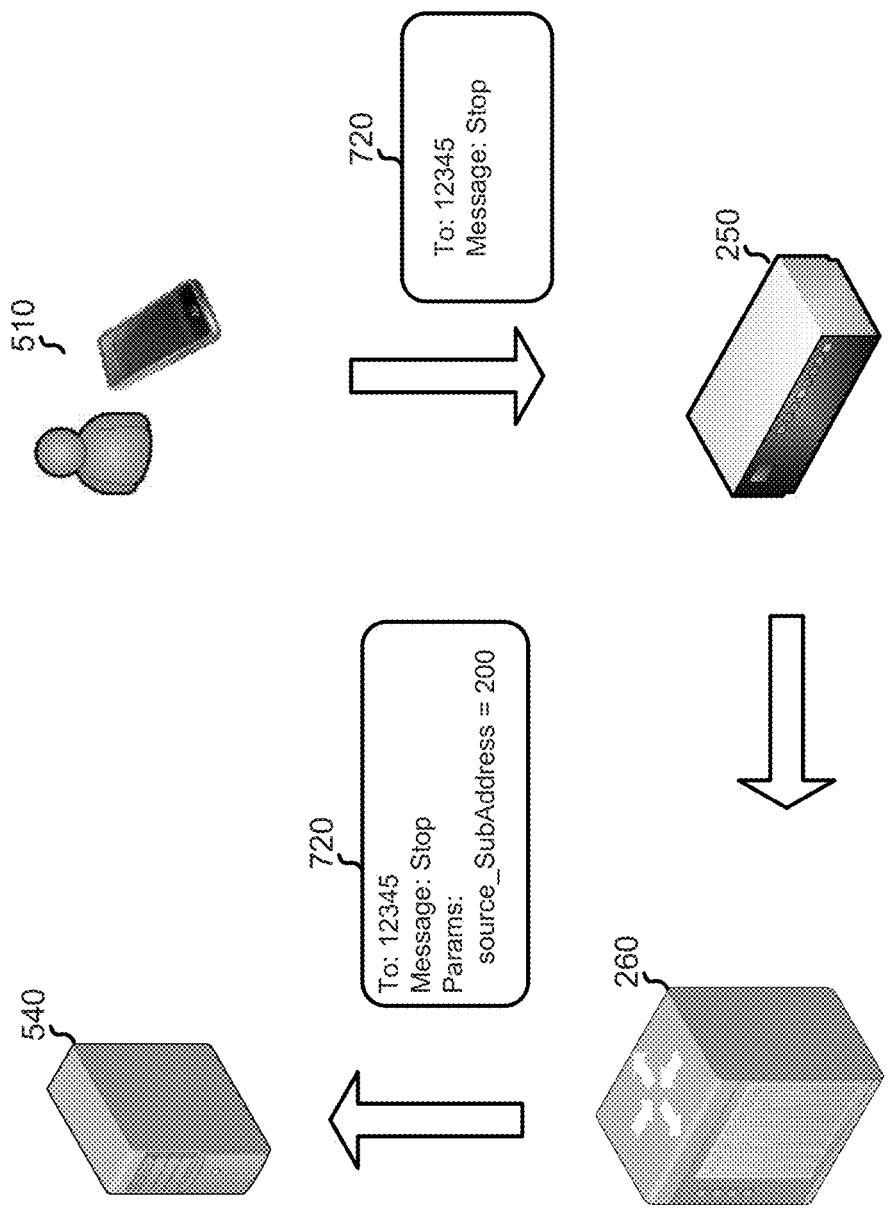
FIG. 7 is a diagram conceptually illustrating an example of application of the process shown in FIG. 6.

FIG. 7 is a diagram conceptually illustrating an example of application of the process shown in FIG. 6. As illustrated, customer 710 (e.g., corresponding to one of user devices 230-240) may desire to opt-out of the messaging service associated with the shortcode "12345" (e.g., the message service to which customer 710 previously opted-in). Customer 710 may send a text message 720 to a messaging gateway, such as messaging gateway 250. Text message 720 may contain text (e.g., "STOP") that indicates that the customer would like to stop the services provided by the application service associated with the shortcode. Service control component 260 may receive text message 720 and determine, based on the text of the message, that it is an opt-out message. Service control component 260 may modify text message 720, such as by appending the "source_subaddress" parameter with a value that indicates that text message 720 is an opt-out message. Service control component 260 may then forward text message 720 to messaging service 740 (e.g., to one of application servers 280-290). Messaging service 740, when it receives text message 720, may, based on the presence of value in the "source_subaddress" parameter of text message 720, unambiguously determine that the message is an opt-out message for the service.

Figure 8:
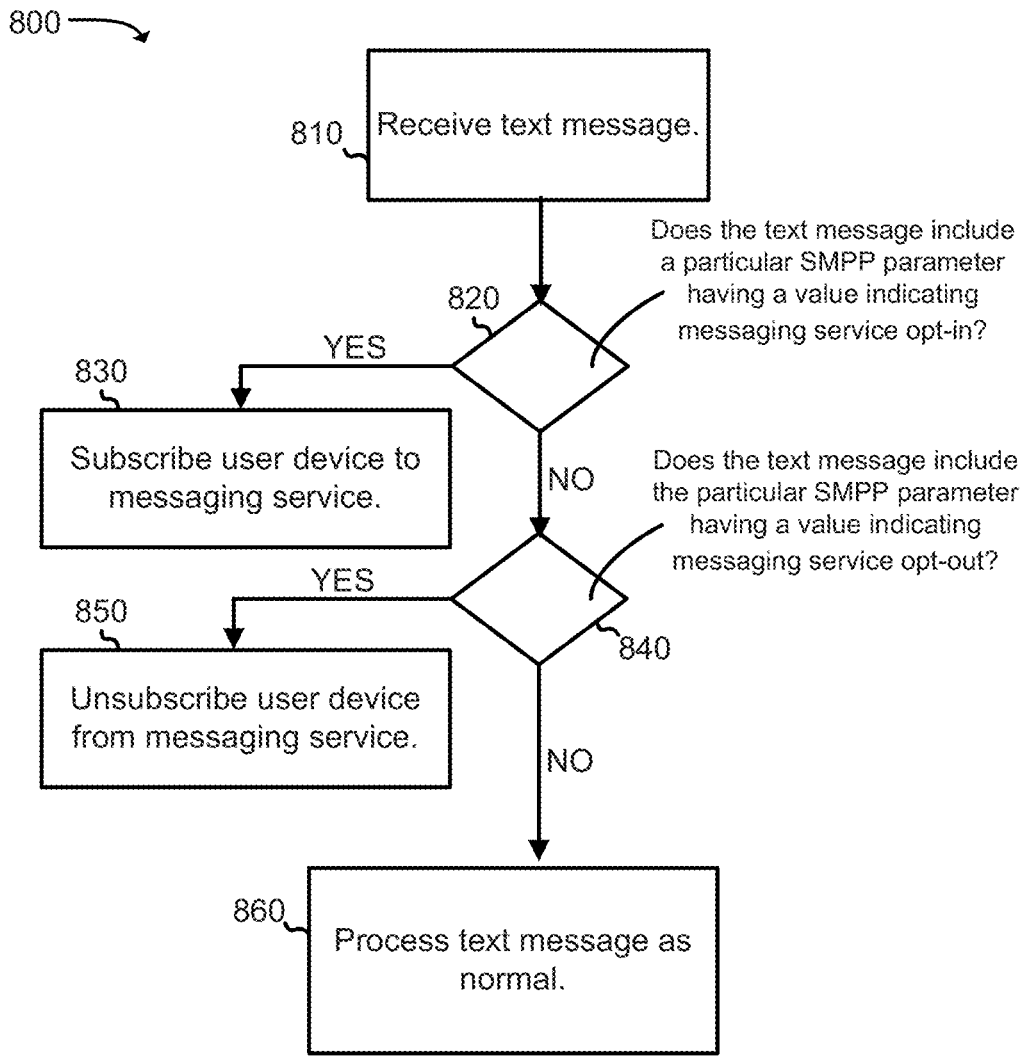
FIG. 8 is a flow chart illustrating an example process relating to processing of opt-in/opt-out messages by a messaging service.

FIG. 8 is a flow chart illustrating an example process 800 relating to processing of opt-in/opt-out messages by a messaging service. Process 800 may be performed, for example, by an application server 280/290 and/or by messaging gateway 270.

Process 800 may include receiving a text message (block 810). The text message may be a message that is received, via the SMPP protocol, by messaging gateway 250 and/or by service control component 260. As described above with reference to FIGS. 4 and 6, service control component 260 may have determined that the text message is an opt-in/opt-out message relating to the messaging service, and in response, may have inserted the optional SMPP parameter to unambiguously indicate messaging service opt-in or opt-out.

Process 800 may include determining whether the text message includes the particular SMPP parameter, and whether the SMPP parameter has a value indicating that the text message is an opt-in message (block 820). As previously mentioned, in one implementation, the value indicating the text message is an opt-in message may be a predetermined value for the parameter (e.g., 100). Additionally, the SMPP parameter may be an optional SMPP parameter such as the SMPP "source_subaddress" parameter.

Process 800 may further include, when the text message is determined to be a messaging service opt-in message (block 820—YES), subscribing the user device, that originated the text message, to the messaging service (block 830). The messaging service may be a messaging service corresponding to the messaging service to which the text message was addressed (e.g., via a shortcode). In one implementation, as illustrated in FIG. 2, the subscription state of the user device, with respect to messaging service, may be indicated by updating database 285/295.

Process 800 may include, when the text message is not determined to be a messaging service opt-in message (block 820—NO), determining whether the text message includes the particular SMPP parameter, and whether the SMPP parameter has a value indicating that the text message is an opt-out message (block 840). As previously mentioned, in one implementation, the value indicating that the text message is an opt-out message may be a predetermined value for the parameter (e.g., 200).

Process 800 may further include, when the text message is determined to be a messaging service opt-out message (block 840—YES), unsubscribing the user device, that originated the text message, from the messaging service (block 850). In one implementation, the subscription state of the user device, with respect to messaging service, may be indicated by updating database 285/295.

Process 800 may further include, when the text message does not include the particular SMPP parameter that indicates that the text message is an opt-out message (block 840—NO), processing the text message as normal (block 860). For example, a text message may be processed pursuant to the specific implementation of the messaging service.

As described above, techniques were described to ensure that a network service provider and an application service provider have a synchronized view of the opt-in/opt-out state of messaging services. A service control component 260, by including a structured field in messages that are opt-in or opt-out messages, may provide an unambiguous signal to application service providers of the opt-in/opt-state of users.

Figure 9:
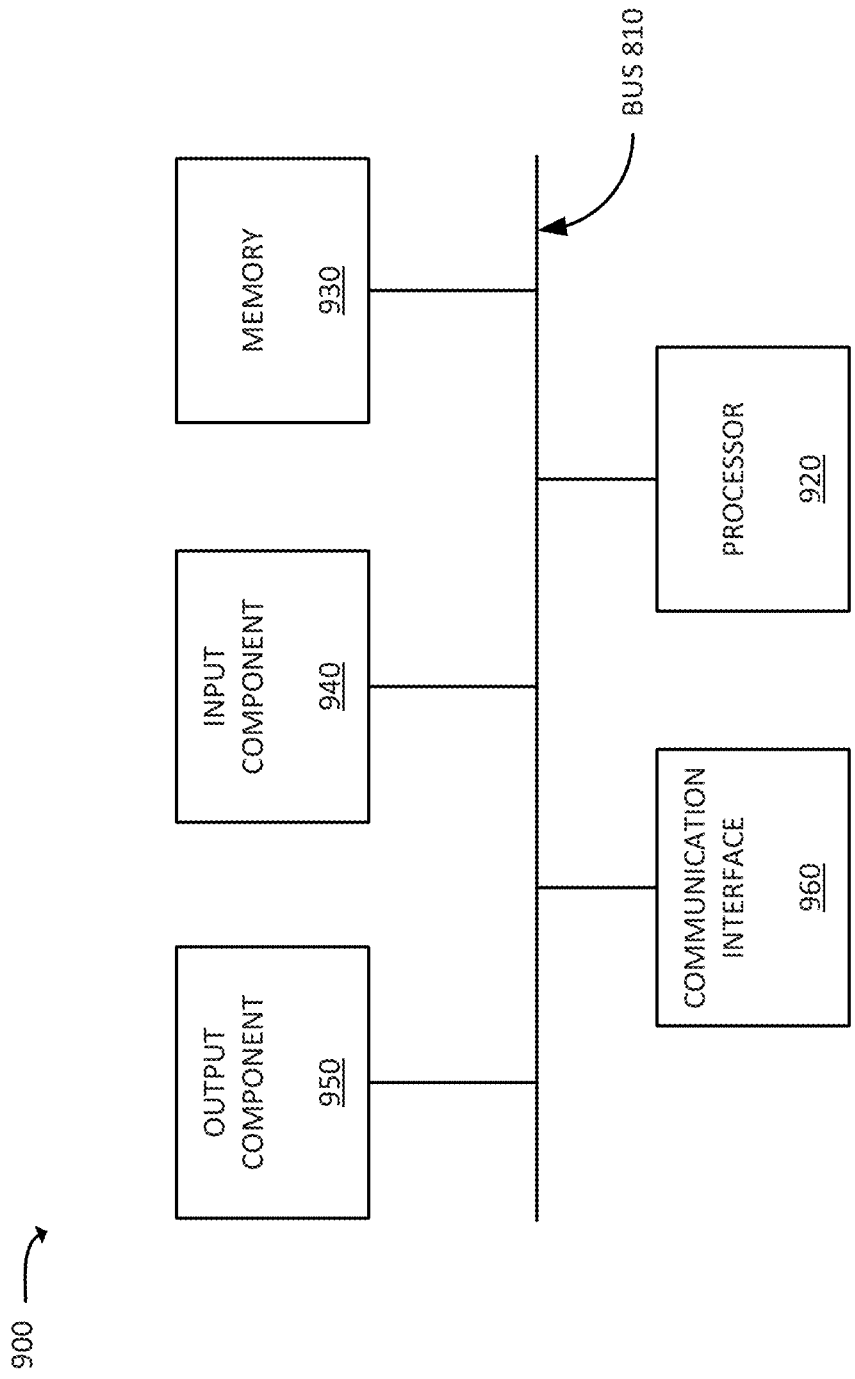
FIG. 9 is a diagram of example components of a device.

FIG. 9 is a diagram of example components of a device 900. Each of the devices illustrated in FIGS. 1, 2, 5 and 7 may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to FIGS. 4, 6, and 8 the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
    receiving, by one or more devices, a text message from a user device;
    determining, by the one or more devices, based on a presence of one or more keywords in the text message, whether the text message is an opt-in or opt-out message associated with a messaging service hosted by one or more servers;
    storing, by the one or more devices and when it is determined that the text message is an opt-in or opt-out message, an indication of a subscription state of the user device with respect to the messaging service;
    modifying, by the one or more devices and when it is determined that the text message is an opt-in or opt-out message, the text message to add a parameter to the text message, the parameter having a first value when the text message is an opt-in message and a second value when the text message is an opt-out message;
    transmitting, when it is determined that the text message is an opt-in or opt-out message, the modified text message towards the one or more servers; and
    transmitting, when it is determined that the text message is not an opt-in or opt-out message, an unmodified version of the text message towards the one or more servers.

2. The method of claim 1, wherein transmitting the modified text message includes transmitting the modified text message pursuant to a Short Message Peer-to-Peer (SMPP) protocol.

3. The method of claim 2, wherein the parameter includes an optional SMPP parameter.

4. The method of claim 3, wherein the parameter includes a source_subaddress SMPP parameter.

5. The method of claim 1, wherein the one or more devices include a Short Message Service Center (SMSC) server.

6. The method of claim 1, wherein the messaging service includes a Short Message Service (SMS) or Multimedia Messaging Service (MMS) messaging service.

7. The method of claim 1, wherein the received text message includes a destination specified by a shortcode.

8. A device comprising:
    a memory; and
    at least one processor to execute instructions in the memory to:
        receive a text message from a user device;
        determine, based on a presence of one or more keywords in the text message, whether the text message is an opt-in or opt-out message associated with a messaging service hosted by one or more servers;
        store, when it is determined that the text message is an opt-in or opt-out message, an indication of a subscription state of the user device with respect to the messaging service;
        modify, when it is determined that the text message is an opt-in or opt-out message, the text message to add a parameter to the text message, the parameter having a first value when the text message is an opt-in message and a second value when the text message is an opt-out message; and
        transmit, when it is determined that the text message is an opt-in or opt-out message, the modified text message towards the one or more servers; and
        transmit, when it is determined that the text message is not an opt-in or opt-out message, an unmodified version of the text message towards the one or more services.

9. The device of claim 8, wherein transmitting the modified text message includes transmitting the modified text message pursuant to the Short Message Peer-to-Peer (SMPP) protocol.

10. The device of claim 8, wherein the parameter includes an optional SMPP parameter.

11. The device of claim 10, wherein the parameter includes a source_subaddress SMPP parameter.

12. The device of claim 6, wherein the one or more devices include a Short Message Service Center (SMSC) server.

13. The device of claim 8, wherein the messaging service includes a Short Message Service (SMS) or Multimedia Messaging Service (MMS) messaging service.

14. The device of claim 8, wherein the received text message includes a destination specified by a shortcode.

15. A method comprising:
    receiving, by one or more devices, a text message originated from a user device and received via a Short Message Peer-to-Peer (SMPP) protocol;
    determining, by the one or more devices, whether the text message includes a particular SMPP parameter;
    determining, by the one or more devices and when the text message is determined to include the particular SMPP parameter, whether the particular SMPP parameter has a value equal to a first value or a second value;
    subscribing, by the one or more devices, the user device to a messaging service when the particular SMPP parameter is determined to be equal to the first value; and
    unsubscribing, by the one or more devices, the user device to the messaging service when the particular SMPP parameter is determined to be equal to the second value.

16. The method of claim 15, wherein the messaging service includes a Short Message Service (SMS) or Multimedia Messaging Service (MMS) messaging service.

17. The method of claim 15, wherein the parameter includes an optional SMPP parameter.

18. The method of claim 17, wherein the parameter includes a source_subaddress SMPP parameter.

* * * * *